United States Patent [19]

Jeppesen

[11] Patent Number: 5,251,795
[45] Date of Patent: Oct. 12, 1993

[54] CLIP-ON CARRYING CASE

[76] Inventor: Bruce Jeppesen, 113 W. Main St., Tremonton, Utah 84337

[21] Appl. No.: 807,174

[22] Filed: Dec. 16, 1991

[51] Int. Cl.5 ............................................. B62J 7/00
[52] U.S. Cl. ................................. 224/34; 224/36; 224/39; 224/42.46 R; 206/5; 248/229; 248/230
[58] Field of Search ............... 224/32 R, 34, 35, 36, 224/39, 42, 30 A, 42.46 R; 206/5; 248/229, 230, 902

[56] References Cited

U.S. PATENT DOCUMENTS

| 2,351,858 | 6/1944 | Ingalls | 248/229 X |
| 2,826,387 | 3/1958 | Rutten | 248/229 |
| 2,891,296 | 6/1959 | Darde | 248/229 X |
| 2,967,690 | 1/1961 | Francis | 248/229 |
| 4,121,798 | 10/1978 | Schumacher et al. | 248/229 X |
| 4,148,224 | 4/1979 | Habler | 224/5 |
| 4,362,286 | 12/1982 | Gentric et al. | 248/229 |
| 4,570,835 | 2/1986 | Criqui et al. | 224/36 |
| 5,005,661 | 4/1991 | Taylor et al. | 224/30 A X |
| 5,039,048 | 8/1991 | Paxton | 248/229 |

FOREIGN PATENT DOCUMENTS

| 11606 | 4/1956 | Fed. Rep. of Germany | 224/39 R |
| 346439 | 4/1931 | United Kingdom | 224/32 R |
| 385741 | 1/1933 | United Kingdom | 224/32 R |
| 746041 | 3/1956 | United Kingdom | 224/42.46 |

Primary Examiner—Allan N. Shoap
Assistant Examiner—Stephen Cronin
Attorney, Agent, or Firm—Mallinckrodt & Mallinckrodt

[57] ABSTRACT

An elongate carrying case, as for a pair of sunglasses, has a pocket panel extending transversely across one of its broad panel walls and secured thereto transversely to provide a side opening for the pocket so-formed externally of such case, into which pocket is placed one leg of a clip-on device having a gripping loop member and a pair of legs extending from such gripping loop member. The pocket panel is interposed between the leg members, which are pressed together about the interposed pocket panel, preferably by screws, to clamp the clip-on device to an operating cable or other part of a riding vehicle and to hold the carrying case and any thereby carried item in place for ready access by the rider while riding. The inner surface of the loop member is preferably serrated to permit easy enlargement of such loop member by filing if and when desired.

6 Claims, 1 Drawing Sheet

CLIP-ON CARRYING CASE

BACKGROUND OF THE INVENTION

1. Field

The invention is in the field of carrying cases, and is concerned particularly with providing a case for sunglasses that can be conveniently attached to a riding vehicle for quick and easy access by the rider.

2. State of the Art

Although eyeglass cases made especially for sunglasses are in common use, so f ar as is known to applicant there is no such case capable of being securely attached to a part of a riding vehicle so as to be ready at all times for quick and easy access by the rider, while riding, without the necessity of stopping the vehicle.

SUMMARY OF THE INVENTION

It was a principal objective in the making of the present invention to provide a carrying case that can be securely clipped onto a readily accessable part of a riding vehicle, such as a motorcycle, bicycle, or snowmobile, and especially onto an operating cable thereof, within easy reach of the rider while riding.

In the accomplishment of that objective, a carrying case (particularly one for receiving and holding a pair of sunglasses) is provided with an exterior pocket extending transversely of the length of the case on a broad panel wall thereof, preferably the rear panel of a case of the type that has its receiving opening at one end. The pocket is adapted to receive one leg of a resilient clip-on device that has a gripping member of open loop formation at one end and a pair of opposed clamping legs extending therefrom, so that the loop end of the device is adapted to exert clamping action upon such gripping member when the legs are pressed together. The pocket panel of the carrying case is received between the legs of the clip-on device, and screws are threaded through the legs to not only tightly clamp the clip-on device to a part of the vehicle that is conveniently rider-accessible while riding, but to also securely fasten the clip-received pocket panel of the carrying case to and between the legs of the clip-on device, thereby firmly holding the case in position on the vehicle.

THE DRAWINGS

The best mode presently contemplated for carrying out the invention in practice is illustrated in the accompanying drawings, in which:

FIG. 1 is a fragmentary perspective view looking from the front of a bicycle at an operating cable thereof to which is attached a carrying case for sunglasses by a clip-on device, both case and clip-on device conforming to the invention;

FIG. 2, a fragmentary rear elevation of the carrying case and clip-on device of FIG. 1, the view being drawn to a considerably larger scale; and FIG. 3, a horizontal section taken on the line 3—3 of FIG. 2.

DETAILED DESCRIPTION OF THE ILLUSTRATED EMBODIMENT

Figure 1:
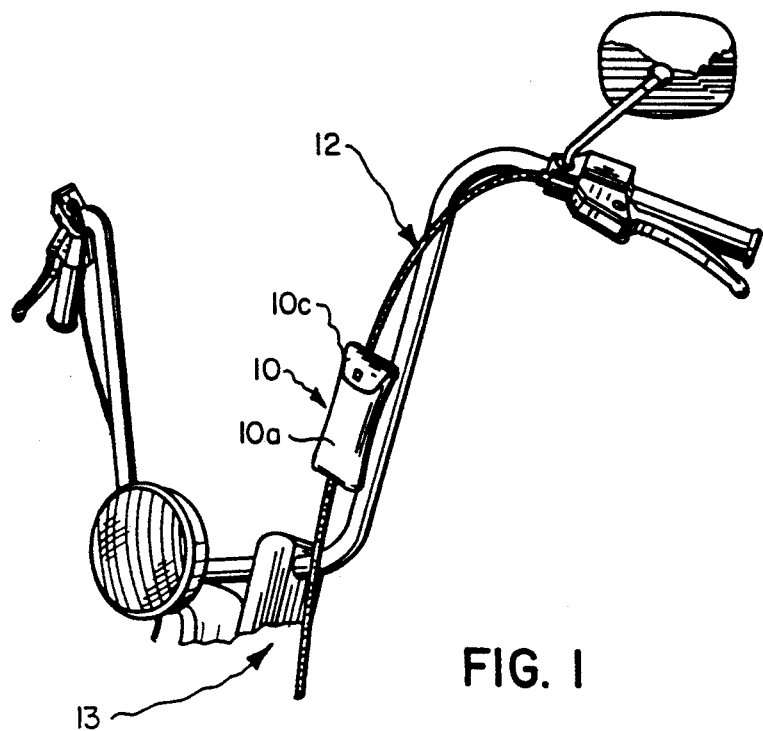

In the form illustrated, an elongate carrying case 10 for a pair of sunglasses 11 is secured to an operating cable 12 of a riding vehicle, here shown as a bicycle 13, by a clip-on device 14.

Figure 2:
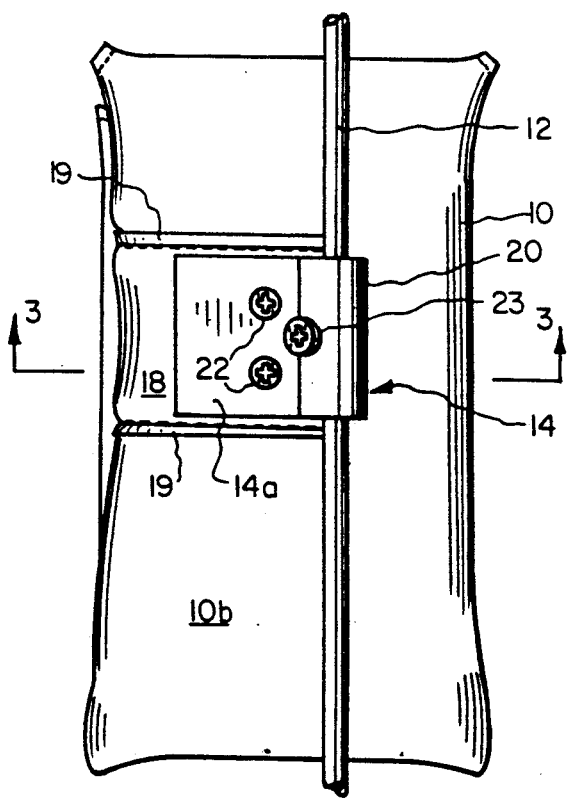
Figure 3:
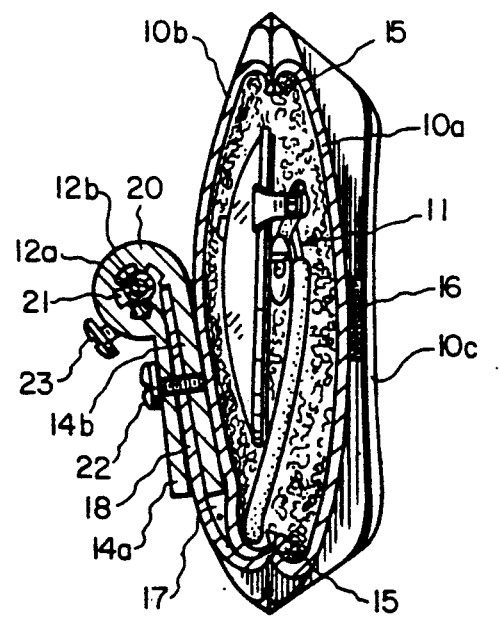

Carrying case 10 is here shown as being formed by opposite broad panel walls 10a and 10b sewed together at inturned margins 15 and having a receiving opening normally closed by a flap 10c that is held closed preferably by interengaging "Velcro" pads 16, FIG. 3. A pocket 17 is formed on one of the broad panel walls, here 10b, transversely and externally of carrying case 10 by a pocket panel 18 that is sewed at opposite side margins, see 19, respectively, FIG. 2, to carrying case panel wall 10b, with the pocket open at an end between such side margins.

Clip-on device 14 is preferably integrally molded to shape from a plastic material having resiliency, and has a gripping member in the form of an open loop 20 for receiving, in this instance, the substantially vertically positioned operating cable 12 of bicycle 13. A pair of opposing leg members 14a and 14b extend from opposing portions of gripping loop member 20 so as to exert clamping pressure on such gripping loop member when such leg members are pressed together.

Pocket 17 is adapted to receive an appropriate leg member, here 14b, of clip-on device 14, so that pocket panel 18 is interposed between such leg members, see FIG. 3. Accordingly, pressing together of the leg members will not only exert clamping action on gripping loop member 20 so as to clip it onto the receiving operating cable 12, but will also clamp pocket panel 18 tightly between leg members 14a and 14b.

For enhancing the gripping action of loop member 20 on cable 12, it is advantageous to serrate the interior surface of such loop member by grooves, e.g. as shown at 21, FIG. 3. The serrations also enable easy enlargement of the cable-receiving loop to accommodate larger diameter cables by merely the expedient of manually filing the interior surface of such loop.

Pressing of leg members 14a and 14b toward each other about pocket panel 18 and holding them in such pressed relationship is advantageously accomplished by one or more, preferably at least two, screws 22 as shown in FIGS. 2 and 3, such screws being threaded through the outer leg and into the inner leg of clip-on device 14 through the pocket panel. To add further securement to this arrangement, especially in instances in which the diameter of the cable is relatively small, one or more set screws 23 may be threaded through gripping loop member 20 to bear against the stationary, tubular, protective covering 12a, FIG. 3, of the cable member 12b of the received operating cable 12.

Whereas this invention is here illustrated and described with reference to an embodiment thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim:

1. A carrying case with a clip-on device enabling attachment of the case to a riding vehicle, comprising a carrying case having opposing broad panel walls and an exterior pocket formed on and extending transversely of one of said broad panel walls by a pocket panel member secured to said one of said broad panel walls of said carrying case externally thereof; a clip-on device of clamp formation having a pair of opposing legs extending from a gripping member of open loop formation adapted to receive a part of said vehicle in the loop thereof, one of said legs being adapted for insertion in said pocket with said pocket panel between said legs, whereby pressing of said legs toward each other and holding them as pressed will clamp said clip-on device to said vehicle and secure said carrying case to said clip-on device; and means for holding said legs of the clip-on device together as pressed, the inner surface of the open loop gripping member of the clip-on device being serrated.

2. A carrying case with a clip-on device enabling attachment of the case to a riding vehicle, comprising a carrying case having opposing broad panel walls and an exterior pocket formed on and extending transversely of one of said broad panel walls by a pocket panel member secured to said one of said broad panel walls of said carrying case externally thereof; a clip-on device of clamp formation having a pair of opposing legs extending from a gripping member of open loop formation adapted to receive a part of said vehicle in the loop thereof, one of said legs being adapted for insertion in said pocket with said pocket panel between said legs, whereby pressing of said legs toward each other and holding them as pressed will clamp said clip-on device to said vehicle and secure said carrying case to said clip-on device; and means for holding said legs of the clip-on device together as pressed; the means for holding the legs of the clip-on device together as pressed being at least one screw threaded through the opposing legs of the gripping device and through the intervening pocket panel.

3. A carrying case in accordance with claim 2, wherein a holding set screw is threaded through the gripping loop member of the clip-on device for pressing against the part of the riding vehicle received by said gripping loop member.

4. A carrying case according to claim 2, wherein the pocket opening is adapted to be uppermost when the carrying case is clipped onto the operating cable of a bicycle and to receive a pair of sunglasses.

5. A carrying case in accordance with claim 2, wherein the gripping loop member of the clip-on device is adapted to receive an operating cable of a bicycle.

6. A clip-on device for attaching a carrying case to a part of a riding vehicle, said device comprising an open loop gripping member of resilient material having a pair of opposing legs extending therefrom and adapted to be pressed together for clamping said loop member after insertion of one of said legs in a pocket formed externally of a carrying case by a pocket panel that is received between said legs of said clip-on device, for clamping said loop member to a received part of a riding vehicle; the inner surface of the open loop gripping member being serrated.

* * * * *